United States Patent [19]
Sahlin

[11] 3,720,455
[45] March 13, 1973

[54] PROJECTION SCREEN

[76] Inventor: John Carl Erik Sahlin, Sergels vag 11 C, S-217 57 Malmo, Sweden

[22] Filed: Aug. 2, 1971

[21] Appl. No.: 168,027

[52] U.S. Cl. ............................................... 350/117
[51] Int. Cl. ........................................... G03b 21/56
[58] Field of Search ..................... 350/117; 40/155

[56] References Cited

FOREIGN PATENTS OR APPLICATIONS

| 805,216 | 12/1958 | Great Britain | 350/117 |
| 717,034 | 2/1942 | Germany | 350/117 |
| 448,823 | 8/1927 | Germany | 350/117 |

*Primary Examiner*—Samuel S. Matthews
*Assistant Examiner*—Richard M. Sheer
*Attorney*—Lerner, David & Littenberg

[57] ABSTRACT

A projection screen comprises a flexible covering forming the picture projecting surface which is stretched to a planar form by an inflatable stiffening structure of flexible material enclosed by the covering.

5 Claims, 4 Drawing Figures

PROJECTION SCREEN

The present invention relates to a projection screen having a plane picture projection surface.

An object of the invention is to provide a projection screen which may be easily transported and stored in a rolled or folded state and has a low weight in order to facilitate transport as well as suspension or raising of the screen.

According to the invention there is provided a projection screen forming a picture projection surface comprising a covering of flexible material, an inflatable flexible tube arranged inside the covering to form a frame therein, and an inflatable stiffening member of flexible material arranged inside the frame, the frame and the stiffening member when being inflated will stretch and rigidify the covering forming the picture projection surface of the screen.

The invention will now be described in detail with reference to the drawing showing illustrative embodiments of the invention.

Figure 2:
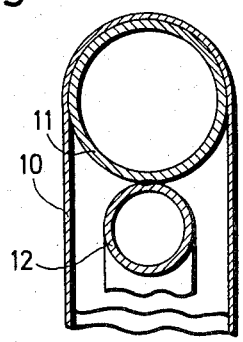
FIG. 2 is an enlarged cross sectional view taken along the line II — II in FIG. 1.

The projection screen is as a whole made of flexible material such as coated fabric and comprises an outer square covering 10 which is closed or closable along the four margins thereof and resembles a conventional cushion-cover. One or both of the faces of the covering may be coated externally with a light-reflecting material. Inside the covering there is provided a stiffening structure including a frame 11 formed by an inflatable tube, and a stiffening member formed as a circular ring 12 also formed by an inflatable tube and inscribed into the frame. The ring is of a smaller dimension in the transverse direction of the screen than the frame 11 as will be seen from FIG. 2, and is connected, e.g., welded to the frame in the four points of tangency. For the inflation of the frame there are provided two diametrically opposed valves 13 while the ring 12 is separately inflatable through a small hose 14 which extends from the covering beyond the frame at a suitable location and is provided with a valve or other closure member. The stiffening structure formed by the frame and the ring is connected with the covering only at the locations where the valves 13 extend from the covering. For the rest the stiffening structure is loosely arranged inside the covering. When the stiffening structure is being inflated, the frame will fill out the marginal portions of the covering and will stretch the covering thereby taking out folds and wrinkles, if any, provided that the circumference of the inflated frame intentionally has been made as large as or somewhat larger than the circumference of the covering. Due to the fact that the stiffening structure is arranged loosely inside the covering it will adapt itself to the available space and will fill out such space without causing folding or distortion of the covering. Thus, the covering will form a plane picture projection surface. It should be noted that the covering 10 proper will not be inflated, only the stiffening structure thereof. In the covering wall there should be provided small openings to allow pressure equalization between the interior of the covering and the surrounding atmosphere. When the stiffening structure is being inflated the frame will be applied against the inner surface of the covering, forming right angles at the four corners thereof although the frame is not necessarily prefabricated with right angles corners. The ring functions as an arc supporting the four sides of the frame in order to eliminate a tendency thereof to sag in the central portions thereof.

When the stiffening structure is not inflated the projection screen may be rolled or folded to a small low-weight package which is easy to transport and store. When the screen is to be used the stiffening structure will be inflated in order to stretch the covering 10. Thereby, the screen will be sufficiently rigid to be placed on a support or leaned against a wall without collapsing. Furthermore, the screen may be suspended or raised by the valves 13 or by one or more flaps which may be provided at the top margin of the covering 10, by using simpler and less bulky means than those required in connection with the handling of conventional projection screens. Since the screen has a low weight it may easily be inclined forwardly in order to counteract parallax.

Figure 3:
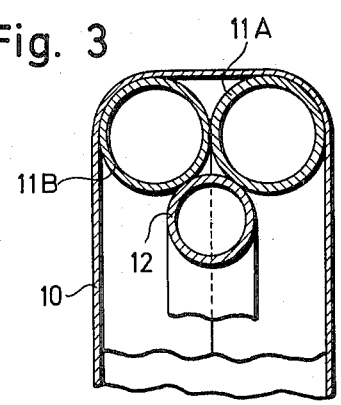
FIG. 3 is a cross sectional view in accordance with FIG. 2 of a modified embodiment.

In the modified embodiment according to FIG. 3 the flexible tube 11 is replaced by two identical tubes 11A and 11B interconnected as by welding in side by side relationship. The ring 12 is arranged in the inner groove formed between the two tubes 11A and 11B and, thereby, the ring is maintained in a proper position within the inflated frame formed by the tubes 11A and 11B without the necessity to arrange an interconnection between these tubes and the ring.

Figure 1:
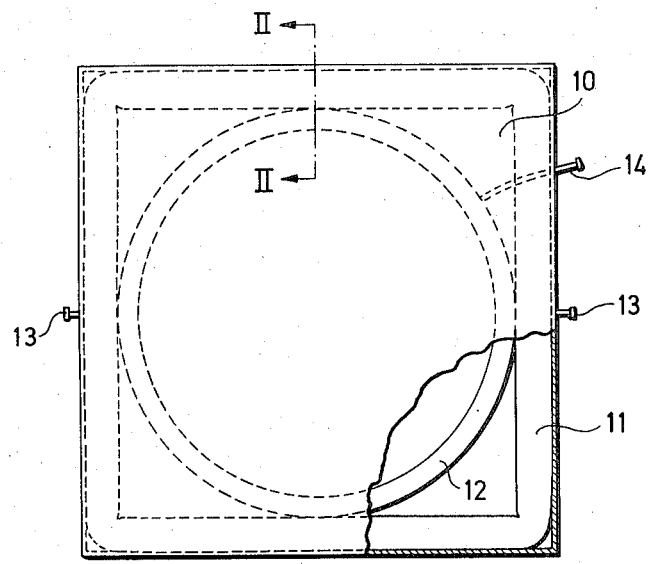
FIG. 1 is an elevational view, partly in section, of one embodiment of the projection screen according to the invention.
Figure 4:
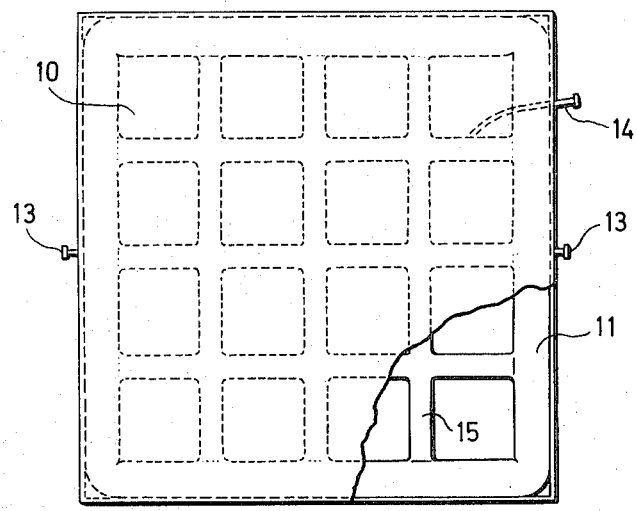
FIG. 4 is a view in accordance with FIG. 1 of another embodiment of the projection screen according to the invention.

In the embodiment according to FIG. 4 there is provided as a substitute for the ring 12 in the embodiment described above a grid 15 which is inflatable separately and is connected with the frame 11 at the inner margin thereof. This grid has a smaller dimension in the transverse direction of the screen than the frame 11 as in the embodiments according to FIGS. 1 to 3.

The part of the stiffening structure arranged inwardly of the frame, i.e., the ring 12 and the grid 15, respectively, should have a smaller dimension in the transverse direction of the screen than the frame and should be centered in relation thereto in order not to form bulges in the faces of the covering. There are no requirements as far as the appearance of the stiffening structure is concerned since this structure will be concealed by the covering. Since this structure is not necessarily welded to the covering the latter may have one face of projection screen material and one face of elastic material allowing the covering to yield when being stretched due to the inflation of the stiffening structure which may be formed of a material particularly suitable therefor such as plastic foil or coated fabric or other flexible material.

What I claim is:

1. A projection screen forming a picture projection surface comprising
   a covering of flexible material for forming a picture projection surface and having a front face and a back face, spaced from each other;

an inflatable flexible tube arranged in the space between the front and back faces of the covering to form a frame therein; and an inflatable stiffening member of flexible material arranged in the space between the front and back faces of the covering of flexible material and within the bounds of the frame, the frame and the stiffening member when inflated stretching and rigidifying the covering forming the picture projection surface of the screen.

2. A projection screen as claimed in claim 1 wherein the stiffening member has a smaller dimension than the frame in the transverse direction of the screen.

3. A projection screen as claimed in claim 1 wherein the stiffening member forms a ring inscribed in the frame.

4. A projection screen as claimed in claim 1 wherein the stiffening member forms a grid surrounded by the frame.

5. A projection screen as claimed in claim 1 wherein the frame is formed by two inflatable tubes of flexible material interconnected in side by side relationship, the stiffening member being received by a groove formed between the tubes.

* * * * *